United States Patent
Ha et al.

(10) Patent No.: US 10,473,153 B2
(45) Date of Patent: Nov. 12, 2019

(54) AIR FOIL BEARING ASSEMBLY

(71) Applicants: Hyundai Motor Company, Seoul (KR); Kia Motors Corporation, Seoul (KR)

(72) Inventors: Kyoung Ku Ha, Gyeonggi-Do (KR); Chang Ha Lee, Gyeonggi-do (KR)

(73) Assignees: Hyundai Motor Company, Seoul (KR); Kia Motors Corporatlion, Seoul (KR)

( * ) Notice: Subject to any disclaimer, the term of this patent is extended or adjusted under 35 U.S.C. 154(b) by 0 days.

(21) Appl. No.: 16/035,651

(22) Filed: Jul. 15, 2018

(65) Prior Publication Data

US 2019/0178286 A1    Jun. 13, 2019

(30) Foreign Application Priority Data

Dec. 11, 2017  (KR) .......................... 10-2017-0169265

(51) Int. Cl.
*F16C 27/02* (2006.01)
*F16C 17/02* (2006.01)

(52) U.S. Cl.
CPC ............ *F16C 17/024* (2013.01); *F16C 27/02* (2013.01)

(58) Field of Classification Search
CPC ................................ F16C 17/024; F16C 27/02
See application file for complete search history.

(56) References Cited

U.S. PATENT DOCUMENTS

| 4,295,689 | A  | * | 10/1981 | Licht | F16C 17/024 384/103 |
| 2011/0052110 | A1 | * | 3/2011 | Kim | F16C 43/02 384/106 |
| 2016/0010682 | A1 | * | 1/2016 | Omori | F16C 17/024 384/103 |
| 2017/0097039 | A1 | * | 4/2017 | Kim | F16C 43/02 |

FOREIGN PATENT DOCUMENTS

| EP | 2 706 245 A1 | 3/2014 |
| JP | 3463026 B2 | 11/2003 |
| KR | 10-1706379 B1 | 2/2017 |

* cited by examiner

*Primary Examiner* — Phillip A Johnson
(74) *Attorney, Agent, or Firm* — Mintz Levin Cohn Ferris Glovsky and Popeo, P.C.; Peter F. Corless (57) ABSTRACT

An air foil bearing assembly is provided. The air foil bearing assembly includes a bearing housing that has a hollow into which a rotary shaft is fitted and a slot of which both ends are open toward front and rear sides formed on an inner circumference surface of the hollow. A bump foil is provided to have a combining portion inserted to the slot and disposed in the inner circumference surface of the hollow. A top foil having a combining portion is inserted to the slot and is disposed in an inner side of the bump foil. A stopper is disposed on one of the combining portions of the bump foil or the top foil to prevent the combining portion of the bump foil or the top foil from being displaced from the slot toward the front and rear sides.

19 Claims, 8 Drawing Sheets

AIR FOIL BEARING ASSEMBLY

CROSS-REFERENCE TO RELATED APPLICATION

This application claims priority to and the benefit of Korean Patent Application No. 10-2017-0169265 filed on Dec. 11, 2017, the entire contents of which are incorporated herein by reference.

BACKGROUND (a) Field of the Invention

The present invention relates to a journal bearing for a rotating machine, and more particularly, to an air foil bearing assembly that supports a load of a rotating body as pressure is formed by introducing air, which is a fluid having viscosity between the rotating body and a foil.

(b) Description of the Related Art

Generally, a bearing is a mechanical element that fixes a rotary shaft of a rotating machine at a predetermined position and rotatably supports the shaft while supporting a shaft weight and a load applied to the shaft. In particular, an air foil bearing is a bearing which supports the load by introducing air, which is a fluid having viscosity, between a rotor and the foil which is in contact with a bearing disk by high-speed rotation of the rotor (or rotary shaft) to generate a pressure. Among the air foil bearings, an air foil journal bearing is a bearing that is configured to support a radial load in a vertical direction.

The air foil journal bearing typically has a bump foil disposed along a hollow circumference of a bearing housing and a top foil disposed within the bump foil. The rotor (or rotary shaft) is disposed within the top foil. The rotor rotates while the outer peripheral surface of the rotor and the inner peripheral surface of the top foil are spaced apart.

The bump foil and the top foil form a combining portion (e.g., joint portion) in which a circumferential end portion is bent radially outward. The combining portion is coupled to a slot formed along an axial direction on the inner circumferential surface of the bearing housing. The combining portion allows the bump foil and the top foil to be fixed to the bearing housing without being rotated or pushed in the circumferential direction when the rotor is rotated. The slot of the bearing housing to which the combining portions of the bump foil and the top foil are engaged is formed to have both axial front and rear sides closed to prevent axial disengagement of the bump foil and the top foil.

Therefore, to assemble the bump foil and the top foil to the bearing housing, the bump foil and the top foil are rolled in the circumferential direction and axially inserted into a hollow (e.g., cavity) of the bearing housing, and then the combining portions of the bump foil and the top foil are engaged to the slot in the radial direction of the hollow. By coupling the combining portions of the bump foil and the top foil to the slot in which both axial front and rear sides are closed, the bump foil and the top foil may be fixed to the bearing housing without being diverted to both axial front and rear sides while the rotary shaft is driven.

However, in the related art, it is difficult to form the slot in which both axial front and rear sides are closed in an inner circumference surface of the bearing housing. In addition, the combining portions of the bump foil and the top foil must be combined to the slot inside the hollow of the bearing housing by rolling the bump foil and the top foil in a circumferential direction, therefore it is difficult to assemble the bump foil and the top foil to the bearing housing, and assembly time may be increased. In addition, in the related art, the front and rear assembly directions of the bump foil and the top foil may be switched depending on the skill of an operator, and the bearing housing may be assembled to the rotary shaft to switch the front and rear assembly directions since the front and rear assembly surfaces are symmetrical.

The above information disclosed in this section is merely for enhancement of understanding of the background of the invention and therefore it may contain information that does not form the prior art that is already known in this country to a person of ordinary skill in the art.

SUMMARY

The present invention has been made in an effort to provide an air foil bearing assembly in which foil components are assembled more easily to a bearing housing.

An air foil bearing assembly according to an exemplary embodiment of the present invention may include a bearing housing having a hollow into which a rotary shaft is fitted and having a slot which is open toward both front and rear ends formed on the inner circumference surface of the hollow; a bump foil having a combining portion inserted to the slot and installed to the inner circumference surface of the hollow; a top foil having a combining portion inserted to the slot and installed to an inner side of the bump foil; and a stopper provided on one of the combining portions of the bump foil or the top foil and prevent the combining portion of the bump foil or the top foil from being displaced from the slot toward front and rear sides.

The stopper may include an engagement key that is formed at front and rear ends of one of the combining portions of the bump foil or the top foil and supports the front and rear surfaces of the bearing housing. Further, the engagement key may surround the front and rear ends of the other one of the combining portions of the bump foil or the top foil and support the front and rear surfaces of the bearing housing.

In addition, an air foil bearing assembly according to an exemplary embodiment of the present invention may include a bearing housing that includes a hollow into which a rotary shaft is fitted and a slot formed on the inner circumference surface of the hollow, wherein the slot has front and rear ends that are open toward front and rear sides of the bearing housing, respectively; a bump foil having a first combining portion engaged to the slot and installed to the inner circumference surface; a top foil having a second combining portion engaged to the slot and installed to an inner side of the bump foil; and an engagement key that extends at front and rear ends of one combining portion among the first combining portion and the second combining portion. The engagement key is bent to surround front and rear ends of the other combining portion, and is configured to be elastically deformed in a width direction of the slot. In an exemplary embodiment of the present invention, the engagement key may extend at front and rear ends of the combining portion of the bump foil, and may be bent to surround front and rear ends of the combining portion of the top foil.

Further, the engagement key of the rear side may be fitted into the front open end of the slot, compressed and deformed, and may be restored by being withdrawn from the rear open end and support the rear side of the bearing housing. In addition, the engagement key of the rear side may surround the rear end of the other combining portion, may be slidably combined to the slot, compressed and deformed. The engagement key of the front side may support the front surface of the bearing housing when the engagement key of the rear side is displaced from the rear open end of the slot and then is restored. Additionally, a notch groove that corresponds to the engagement key may be formed at the front and rear ends of the other combining portion.

In an exemplary embodiment of the present invention, a recess accommodating that accommodates the engagement key may be formed at the front and rear surfaces of the bearing housing. At the recess, the front and rear open ends of the slot and a supporting surface that supports the engagement key may be formed.

Further, the engagement key may include an engagement end that supports the front and rear sides of the bearing housing and a bending portion that extends at both ends of the one combining portion and is bent such that a width between the engagement end and the one combining portion is greater than a width of the slot. The bending portion may include a plane surface or a multi-stage step surface that is connected with the engagement end of the engagement key.

In another exemplary embodiment of the present invention, the engagement key of the rear side may include an engagement end that supports the rear side of the bearing housing, and a rear bending portion that extends at the rear end of the one combining portion and is bent such that a width between the engagement end and the one combining portion is greater than a width of the slot. On the other hand, the engagement key of the front side may include a front bending portion that extends at the front end of the one combining portion and is bent at about a right angle. Alternatively, the front bending portion may be welded to the front end of the one combining portion.

In exemplary embodiments of the present invention, a slot which is opened toward the front and rear sides of a bearing housing is formed, and accordingly, manufacturing of the slot may be simplified and combining portions of a bump foil and a top foil may be prevented from being displaced from the slot. Further, the combining portions of the bump foil and the top foil are slidably combined to the slot, and accordingly, the assembly of the bump foil and the top foil to the bearing housing may be simplified, and assembly time may be reduced.

In addition, an effect that can be obtained or that is predicted with an exemplary embodiment of the present invention is directly or suggestively described in a detailed description of an exemplary embodiment of the present invention. That is, various effects that are predicted according to an exemplary embodiment of the present invention will be described within a detailed description to be described later.

BRIEF DESCRIPTION OF THE DRAWINGS

These drawings are for the purpose of describing an exemplary embodiment of the present invention, and therefore the technical spirit of the present invention should not be construed as being limited to the accompanying drawings.

DESCRIPTION OF SYMBOLS

1: rotational shaft
10: bearing housing
11: hollow
13: slot
15: front open end
16: rear open end
30: bump foil
31: elastic bump
33: first combining portion
50: top foil
53: second combining portion
61: notch groove
65: recess
67: supporting surface
70: stopper
71: first engagement key
72: second engagement key
73, 74: engagement end
75, 76: bending portion
77, 78: step surface
81: plane surface
100: air foil bearing assembly

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

The drawings and description are to be regarded as illustrative in nature and not restrictive and like reference numerals designate like elements throughout the specification.

Since size and thickness of each component illustrated in the drawings are arbitrarily represented for convenience in explanation, the present invention is not particularly limited to the illustrated size and thickness of each component and the thickness is enlarged and illustrated in order to clearly express various parts and areas.

In the following description, dividing names of components into first, second and the like is to divide the names because the names of the components are the same as each other and an order thereof is not particularly limited. In addition, the terms "unit", "part", "means", etc., which are described in the specification, mean a unit of a comprehensive configuration that performs at least one function or operation.

Figure 1A:
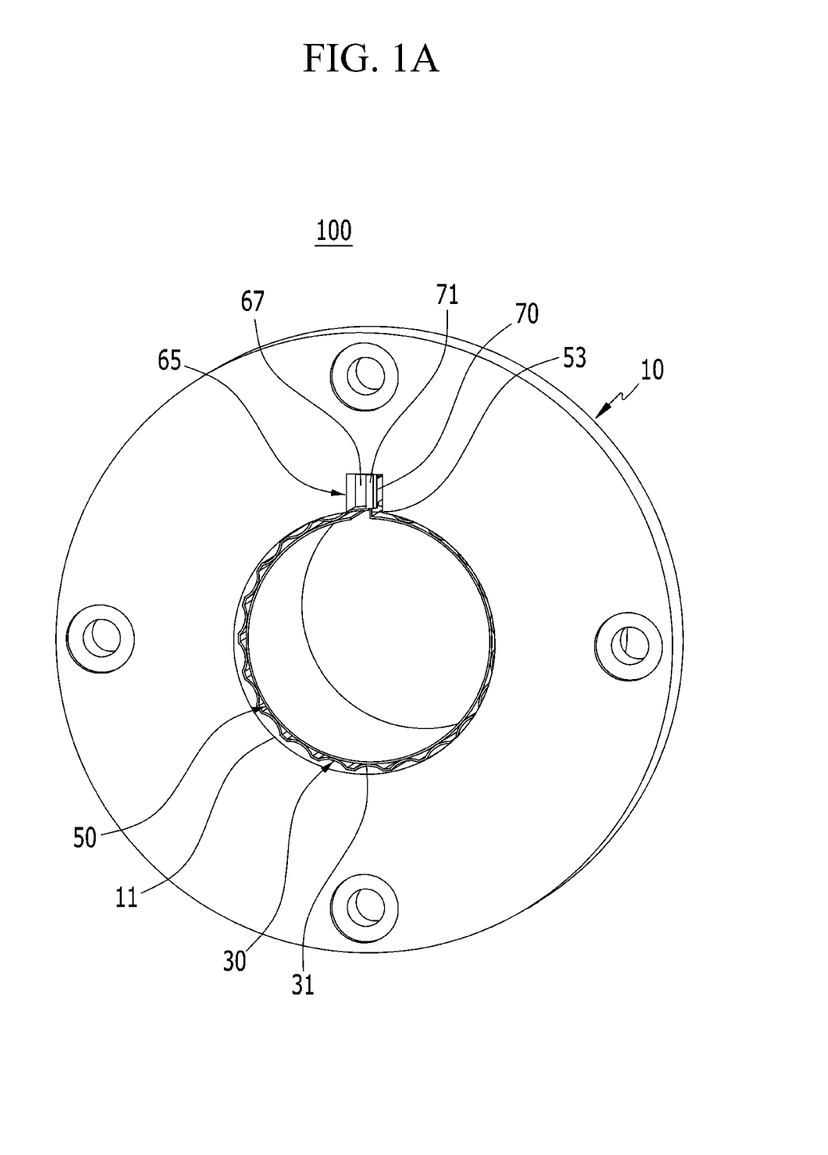
FIGS. 1A-1B are combination perspective views illustrating an air foil bearing assembly according to an exemplary embodiment of the present invention.
Figure 1B:
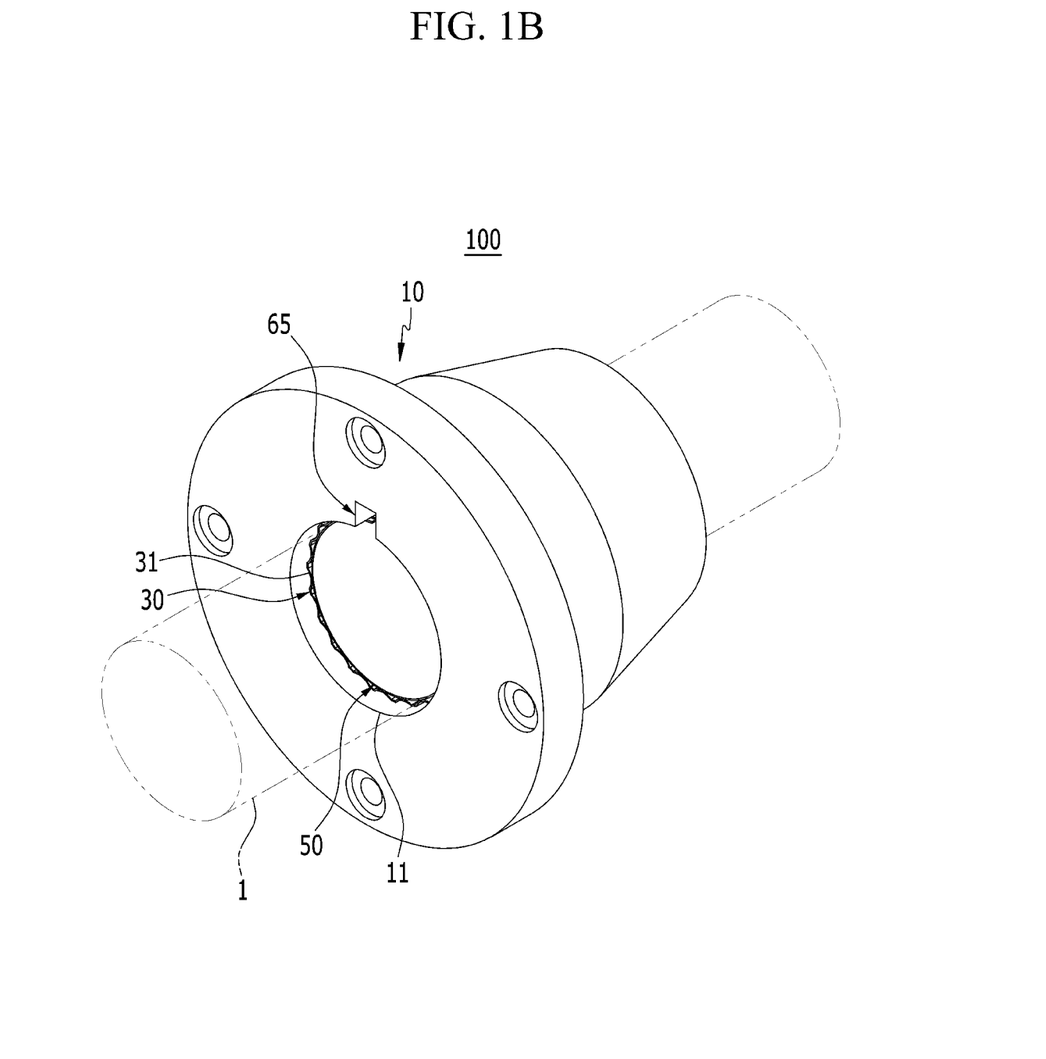
Figure 2:
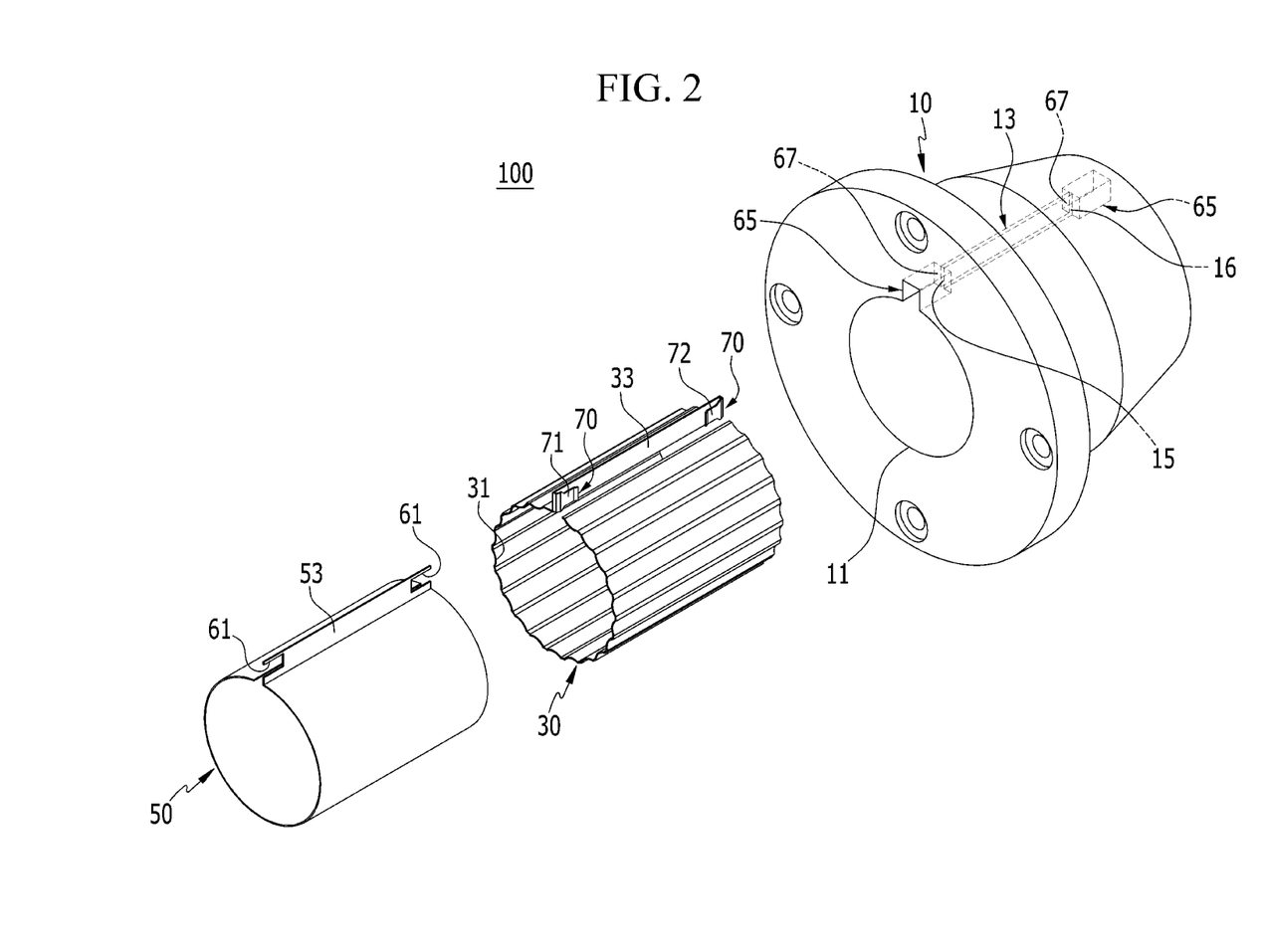
FIG. 2 is a detailed perspective view illustrating the air foil bearing assembly according to the exemplary embodiment of the present invention.

FIGS. 1A-1B are combination perspective views illustrating an air foil bearing assembly according to an exemplary embodiment of the present invention, and FIG. 2 is a detailed perspective view illustrating the air foil bearing assembly according to the exemplary embodiment of the present invention. Referring to FIG. 1A, FIG. 1B and FIG. 2, the air foil bearing assembly 100 according to the exemplary embodiment of the present invention is configured in a rotating machine having a rotary shaft 1 (also referred to as "rotor" in the art) as a rotating body.

The air foil bearing assembly 100 supports a weight of the rotary shaft 1 and a load applied to the rotary shaft 1 in the rotating machine and rotatably supports the rotary shaft 1. Furthermore, the air foil bearing assembly 100 according to the exemplary embodiment of the present invention may include a journal bearing that supports a radial load perpendicular to an axial direction of the rotary shaft 1 in the rotating machine.

The air foil bearing assembly 100 described above is effective for supporting the rotary shaft 1 that rotates at a high speed. For example, the air foil bearing assembly 100 may be applied to the rotary shaft 1 that rotates at the high speed in the rotating machine such as a turbo compressor, a turbo cooler, a turbo generator, an air compressor, an air blower, or the like mounted within a vehicle. However, the scope of the present invention should not be construed as being limited to the rotating machine in the field of automobiles, and the technical spirit of the air foil bearing assembly 100 according to the present invention may be applied to rotating machines of various kinds and applications.

In the exemplary embodiment of the present invention, the axial direction of the rotary shaft 1 is defined as a front-rear direction, a direction perpendicular to the axial direction is defined as a radial direction, and a surface positioned on a front side is defined as a front surface and a surface positioned on a rear side is defined as a rear surface. The definition of the direction is a relative meaning and the direction may vary depending on a reference position of the rotary shaft 1 and an assembling position of the bearing assembly. Therefore, the reference direction is not particularly limited to the reference direction of the exemplary embodiment. In addition, hereinafter, the term "end" may be defined as either end and may be defined as a certain portion (end portion) including the end.

The air foil bearing assembly 100 according to an exemplary embodiment of the present invention has a structure which may be assembled with foil components. The exemplary embodiment of the present invention provides an air foil bearing assembly which may prevent a foil component having a relatively small thickness from being displaced from a fixed position by external excitation or impact with a simplified structure. The air foil bearing assembly 100 according to the exemplary embodiment of the present invention may include a bearing housing 10, a bump foil 30, a top foil 50, and a stopper 70. The bearing housing 10 may include a front surface and a rear surface to be coupled to the rotating machine, and may include a hollow 11 into which the rotary shaft 1 of the rotating machine may be rotatably inserted. The bearing housing 10 may further include a slot 13 in the front and rear direction in the axial direction on the inner peripheral surface of the hollow 11 to mount the bump foil 30 and the top foil 50, which will be further described below.

Additionally, a front end of the slot 13 may be open on the front surface of the bearing housing 10 and a rear end thereof may be open on the rear surface the bearing housing 10. Hereinafter, the front end of the slot 13 opened toward the front surface of the bearing housing 10 is referred to as a front open end 15, the rear end of the slot 13 opened toward the rear surface of the bearing housing 10 is referred to as a rear open end 16.

In the exemplary embodiment of the present invention, the bump foil 30 may be disposed inside the hollow 11 of the bearing housing 10 and may be rolled as a circular shape and disposed abutting the inner peripheral surface of the hollow 11. The bump foil 30 may include a plurality of elastic bumps 31 that protrude inward in a circular shape. The elastic bumps 31 may protrude to be convex in the radial direction of the hollow 11 in the circumferential direction of the bump foil 30, that is, protruding into the hollow in convex shapes.

The bump foil 30 may have a first combining portion 33 at a first end thereof that is configured to be coupled to the slot 13 from the front surface side of the bearing housing 10 to the front open end 15 of the slot 13. The combining portion 33 may be formed as a flat plate (e.g., strip) portion bent radially outward at the first end of the bump foil 30. The bump foil 30 may be rolled in a first circumferential direction from the inside of the hollow 11 while the first combining portion 33 is engaged to the slot 13 and has a free end as a second end disposed adjacent to the first combining portion 33. Further, the bump foil 30 may have at least one incision line (not illustrated in figure) in the circumferential direction at a portion excluding the first combining portion 33 to adjust rigidity.

In addition, the top foil 30 may be installed inside the bump foil 30 and may be rolled as a circular shape and disposed abutting the elastic bumps 31 of the bump foil 30. The top foil 50 may have a second combining portion 53 at a first end thereof that is configured to be coupled to the slot 13 from the front surface side of the bearing housing 10 to the front open end 15 of the slot 13. The second combining portion 53 may be formed as the flat plate (e.g., strip) portion bent radially outward at the first end of the top foil 50. The top foil 50 may be rolled in a second circumferential direction (e.g., a direction opposite to the first rolling direction of the bump foil) from the inside of the bump foil 30 while the second combining portion 53 is engaged to the slot 13, and has the free end as a second end disposed adjacent to the combining portion 53.

In particular, the top foil 50 rolled as a circular shape at the inside and the bump foil 30 rolled as a circular shape at the outside may be combined (e.g., inserted) to the slot by the respective combining portions 33 and 53. For example, the first combining portion 33 of the bump foil 30 and the second combining portion 53 of the top foil 50 may be overlapped on a plane, and the combining portions 33 and 53 may be inserted into the slot 13 at the front surface side of the bearing housing 10 through the front open end 15 of the slot 13. Subsequently, the rotary shaft 1 may be inserted through the inside of the top foil 50 to penetrate the top foil 50. In particular, the rotary shaft 1 may be disposed to be spaced on the inner side of the top foil 50.

In addition, the figures show that one top foil 50 is provided inside the bump foil 30, however, the present invention is not limited thereto, and a second top foil (not illustrated in figures) may be further installed inside the top foil 50. The second top foil may be rolled in the first circumferential direction (e.g., a direction same as the rolling direction of the bump foil) from the inside of the top foil 50 while a first side end is engaged to the slot 13, and has the free end as a second end disposed adjacent to the second combining portion 53 of the top foil 50.

In the exemplary embodiment of the present invention, the stopper 70 may prevent the first combining portion 33 of the bump foil 30 and the second combining portion 53 of the top foil 50 from being displaced from the slot 13 through the front open end 15 or the rear open end 16 of the slot 13. In other words, the stopper 70 may prevent the first and second combining portions 33 and 53 from being displaced from the slot 13 due to external excitation or impact when the rotating machine is operated. The stopper 70 may be disposed on one of the combining portions 33 and 53 of the bump foil 30 or the top foil 50. For example, the stopper 70 may be disposed on the first combining portion 33 of the bump foil 30 or on the second combining portion 53 of the top foil 50. In an exemplary embodiment of the present invention, the stopper 70 may be disposed on the first combining portion 33 of the bump foil 30.

Figure 3:
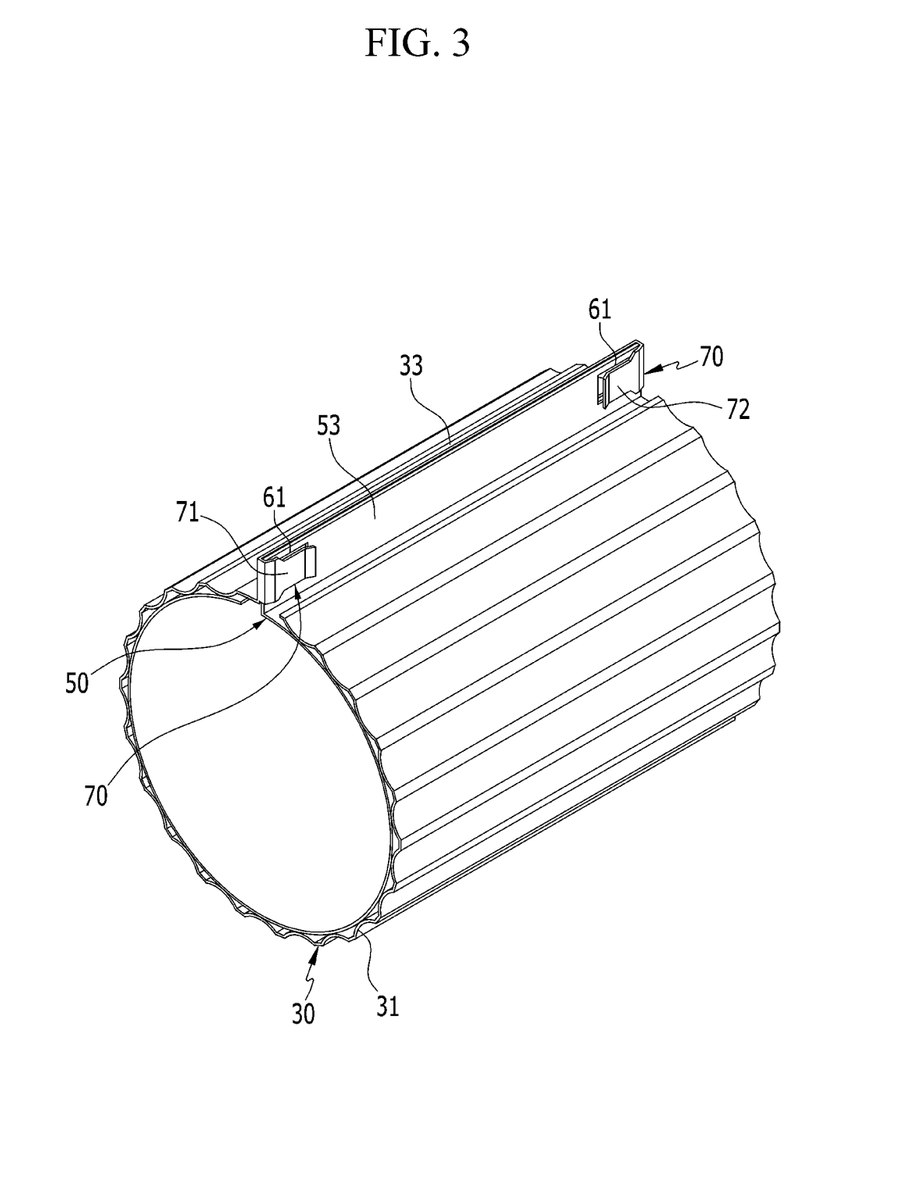
FIG. 3 is a view illustrating a bump foil and a top foil applied to the air foil bearing assembly according to the exemplary embodiment of the present invention.
Figure 4:
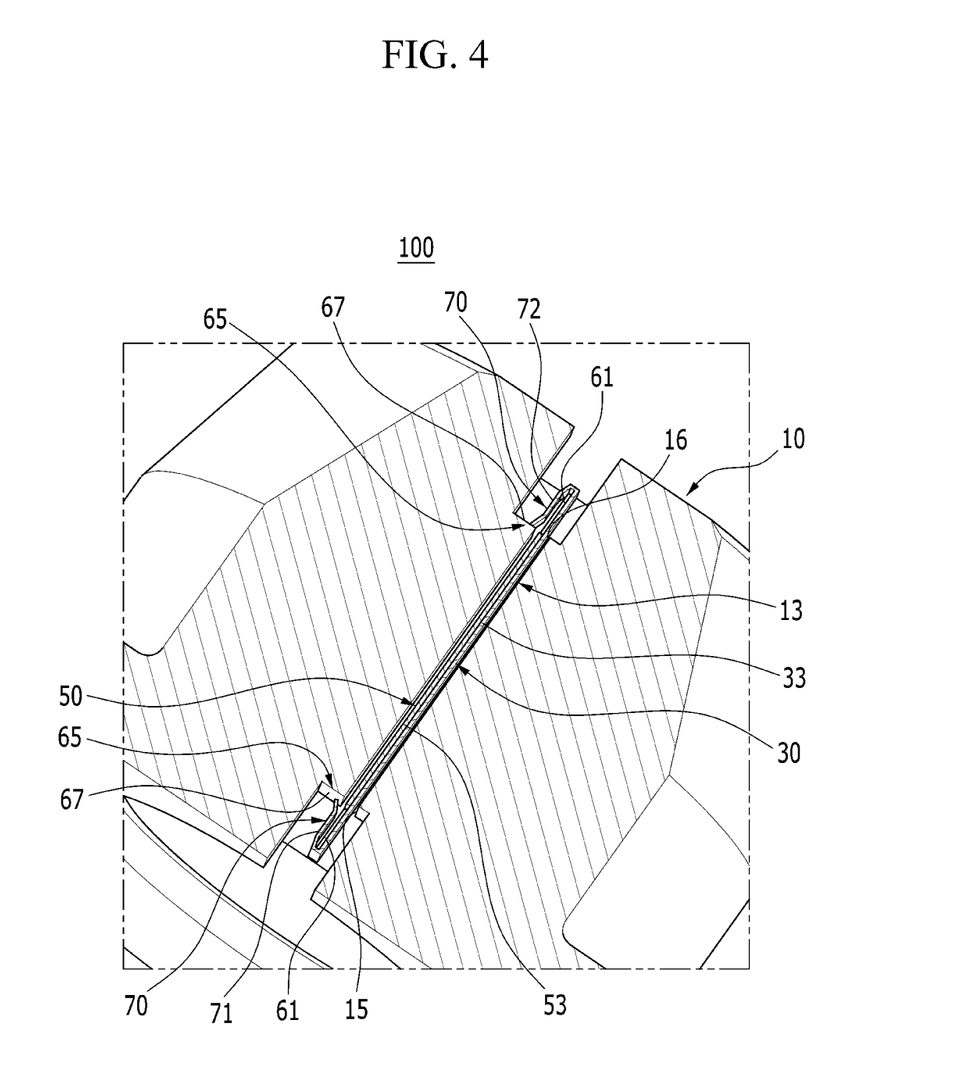
FIG. 4 is a cross-sectional schematic view of FIG. 1B illustrating a foil combining structure of the bearing housing applied to the air foil bearing assembly according to an exemplary embodiment of the present invention.

FIG. 3 is a view illustrating a bump foil and a top foil applied to the air foil bearing assembly according to the exemplary embodiment of the present invention, and FIG. 4 is a cross-sectional schematic view of FIG. 1B illustrating a foil combining structure of the bearing housing applied to the air foil bearing assembly according to an exemplary embodiment of the present invention. Referring to FIG. 3 and FIG. 4 in view of FIG. 1A, FIG. 1B and FIG. 2, the stopper 70 according to the exemplary embodiment of the present invention may be integrally disposed on both a front end and a rear end of the first combining portion 33, and may include engagement keys 71 and 72 that support the front surface side and the rear surface side of the bearing housing 10. The engagement keys 71 and 72 may surround both the front and rear ends of the second combining portion 53 and support the front surface side and the rear surface side of the bearing housing 10.

The engagement keys 71 and 72 may be integrally extended at both a front end and a rear end of the first combining portion 33, bent (e.g., folded) to surround both the front and rear ends of the second combining portion 53, and may be elastically deformed in a width direction of the slot 13. Hereinafter, the engagement key 71 provided at the front end side of the first combining portion 33 is referred to as "a first engagement key 71", and the engagement key 72 provided at the rear end side of the first combining portion 33 is referred to as "a second engagement key 72".

The second engagement key 72 may be fitted into the front open end 15 of the slot, elastically compressed and deformed. Further, the second engagement key 72 may be elastically restored by being withdrawn from the rear open end 16 and support the rear side of the bearing housing 10. Particularly, the second engagement key 72 may surround the rear end of the second combining portion 53, slidably combined to the slot 13, elastically compressed and may then be deformed. On the other hand, the first engagement key 71 may support the front surface of the bearing housing 10 when the second engagement key 71 is displaced from the rear open end 16 of the slot 13 and then is restored.

Moreover, the second engagement key 72 may overlap the second combining portion 53 and be disposed to abut the inner wall surface of the slot 13 by the thickness of the second combining portion 53 when the second engagement key 72 is compressed and deformed inside the slot 13, and therefore, a frictional force may be generated. The frictional force may adversely affect assembly performance of the first and second combining portions 33 and 53 to the slot 13. To prevent the adverse frictional force, in an exemplary embodiment of the present invention, a notch groove 61 that corresponds to the first and second engagement keys 71 and 72 may be formed at the both ends of the second combining portion 53. The notch groove 61 may accommodate the second engagement key 72 when the second engagement key 72 is compressed and deformed inside the slot 13. Further, the notch groove 61 may be formed by notch manufacturing the both end portions of the second combining portion 53, and accordingly, weight of the top foil 50 may be reduced.

Further, since the first engagement key 71 supports the front surface side of the bearing housing 10 and the second engagement key 72 supports the rear surface side of the bearing housing 10, the engagement keys 71 and 72 may protrude from the front and rear surfaces of the bearing housing 10. The protrusions of first and second engagement keys 71 and 72 may be considered as interference protrusions when the bearing housing 10 is assembled to the rotational machine. Accordingly, in an exemplary embodiment of the present invention, the front open end 15 and the rear open end 16 of the slot 13 may be disposed on the front surface and the rear surface of the bearing housing 10, and a recess groove 65 that accommodates the first and second engagement keys 71 and 72 may be formed. The recess 65 may be concave at the front surface of the bearing housing 10 toward a rear side and concave at the rear surface of the bearing housing 10 toward a front side. Additionally, the recess 65 may form the front open end 15 and the rear open end 16 of the slot 13, and may include a supporting surface 67 that supports the first and second engagement keys 71 and 72.

Figure 5:
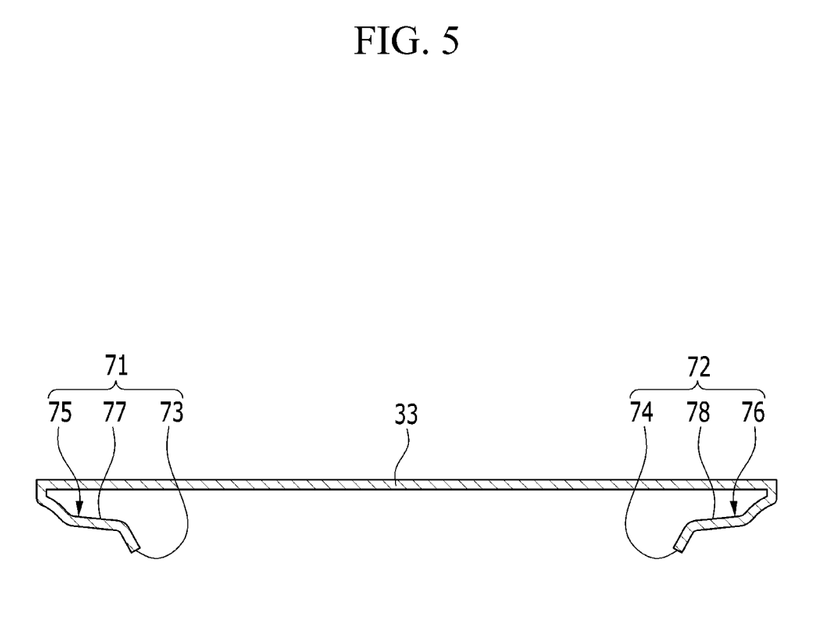
FIG. 5 is a schematic view illustrating an engagement key applied to the air foil bearing assembly according to an exemplary embodiment of the present invention.

As illustrated in FIG. 5, the first and second engagement keys 71 and 72 may be formed in the same shape as each other, integrally extend at the both ends of the first combining portion 33, and may be bent (e.g., folded) in an opposite direction to each other. The first and second engagement keys 71 and 72 may respectively include engagement ends 73 and 74 that support the front surface and the rear surface of the bearing housing 10 (hereinafter, refer to FIG. 1A, FIG. 1B and FIG. 2). Further, the first and second engagement keys 71 and 72 may extend at the both ends of the first combining portion 33, and may respectively include bending portions 75 and 76 bent such that a width between the respective engagement ends 73 and 74 and the first combining portion 33 is greater than a width of the slot 13 (hereinafter, refer to FIG. 2).

The bending portions 75 and 76 may be formed with a width between the respective engagement ends 73 and 74 and the first combining portion 33 greater than a width of the slot 13 to allow the respective engagement ends 73 and 74 to support the front surface and rear surface of the bearing housing 10 when the bending portions 75 and 76 are restored. In addition, the bending portions 75 and 76 may include multi-stage step surfaces 77 and 78 connected with the engagement ends 73 and 74. The step surfaces 77 and 78 may be defined as bending surfaces bent as a multi-stage. The bending portions 75 and 76 may include multi-stage step surfaces 77 and 78 to allow elastic deformation of the bending portions 75 and 76 and engagement of the engagement ends 73 and 74 to the front surface and the rear surface of the bearing housing 10.

Hereinafter, the assembling method and the operation of the air foil bearing assembly 100 according to another exemplary embodiment of the present invention, which is configured as above will be described in detail with reference to the accompanying drawings.

Figure 6A:
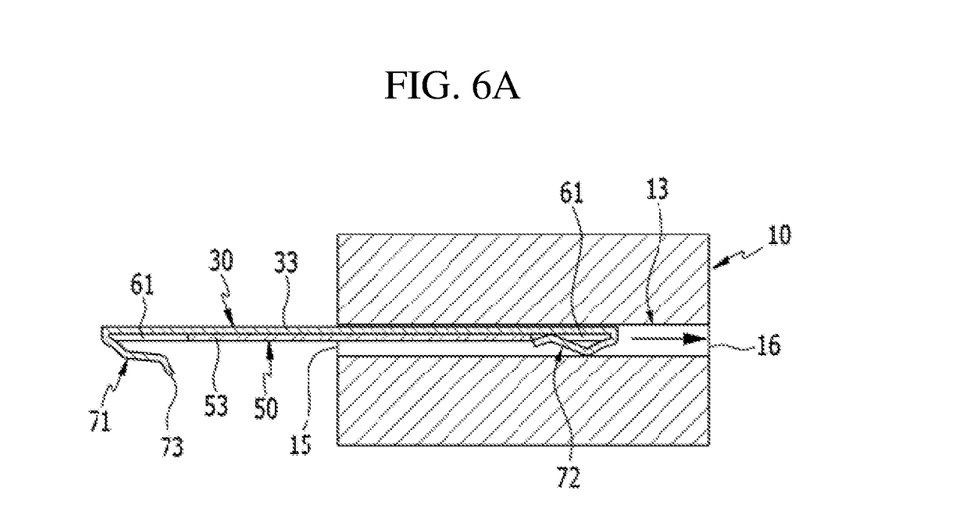
FIGS. 6A-6B are cross-sectional schematic views of FIG. 1B illustrating assembly process of the air foil bearing assembly according to an exemplary embodiment of the present invention.
Figure 6B:
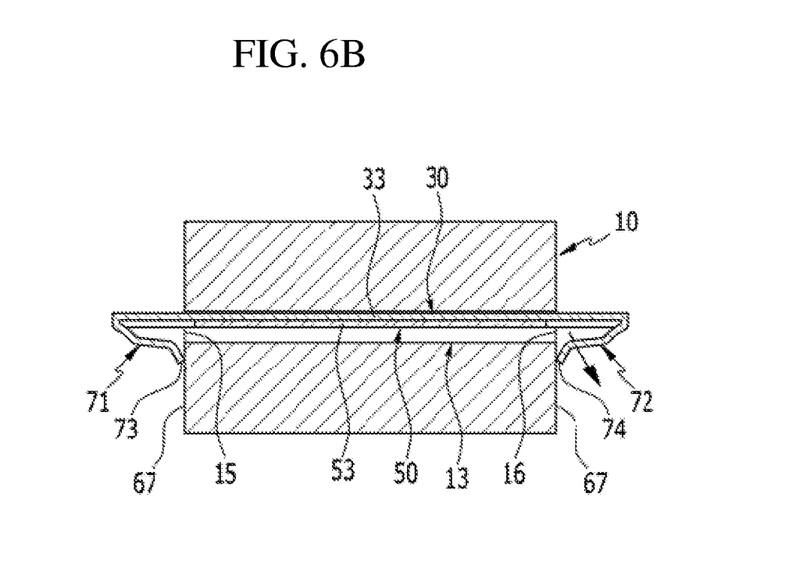

FIGS. 6A-6B are cross-sectional schematic views of FIG. 1B illustrating assembly process of the air foil bearing assembly according to an exemplary embodiment of the present invention. Referring to the figures, in an exemplary embodiment of the present invention, while the top foil 50 is rolled to be a circular shape in a second direction on a center of the second combining portion 53, the second combining portion 53 may be fitted between the first and second engagement keys 71 and 72 of the first combining portion 33, and the bump foil 30 may be rolled to be a circular shape in a first direction on a center of the first combining portion 33.

As another example, while the bump foil 30 and the top foil 50 are rolled to be a circular shape, the top foil 50 may be disposed inside the bump foil 30, and the second combining portion 53 may be fitted between the first and second engagement keys 71 and 72 of the first combining portion 33. The first and second combining portions 33 and 53 may overlap each other, the notch groove 61 may be formed at the both ends of the second combining portion 53, the first and second engagement keys 71 and 72 may be maintained to be restored, and surround the both ends of the second combining portion 53 and are positioned adjacent to the notch groove 61.

In particular, in an exemplary embodiment of the present invention, as illustrated in FIG. 6A, the second engagement key 72 may be fitted into the front open end 15 of the slot 13 through the front side recess 65 of the bearing housing 10. Then, the second engagement key 72 may be compressed and deformed inside the slot 13, and may slide toward the rear open end 16 of the slot 13 along the slot 13. The second engagement key 72 may be elastically compressed and deformed inside the slot 13, and may be accommodated in the notch groove 61 of the second combining portion 53.

In an exemplary embodiment of the present invention, the second engagement key 72 compressed and deformed inside the slot 13 may be accommodated in the notch groove 61 of the second combining portion 53 and slidably combined to the slot 13, therefore friction between the second engagement key 72 and the inner wall surface of the slot 13 may be reduced. Accordingly, in an exemplary embodiment of the present invention, the assembly performance of the first and second combining portions 33 and 53 to the slot 13 may be further improved.

As illustrated in FIG. 6B, the second engagement key 72 may be slidably combined to the slot 13, and accordingly, the second engagement key 72 may be displaced from the rear open end 16 of the slot 13 at the recess 65 of the rear side of the bearing housing 10, and may be elastically restored and deformed to support the supporting surface 67 of the recess 65 of the rear surface side through the engagement end 74.

Moreover, the first engagement key 71 may be maintained to be restored and deformed and support the supporting surface 67 of the recess 65 of the front surface side through the engagement end 73 while the second engagement key 72 is displaced from the rear open end 16 of the slot 13 and is restored and deformed. Accordingly, the first and second engagement keys 71 and 72 of the first combining portion 33 may surround both ends of the second combining portion 53 to be respectively accommodated in the recess 65 of the front surface side and the rear surface side of the bearing housing 10 and support the supporting surface 67 of the respective recess 65 through the engagement ends 73 and 74 while the first combining portion 33 of the bump foil 30 and the second combining portion 53 of the top foil 50 are slidably combined to the slot 13.

Particularly, the bump foil 30 may contact the inner circumference surface of the hollow 11 of the bearing housing 10 and be rolled in the first circumferential direction while the bump foil 30 is engaged to the slot 13 through the first combining portion 33 and have a free end adjacent to the first combining portion 33. Then, the top foil 50 may contact the elastic bumps 31 inside the bump foil 30 and be rolled in the second circumferential direction while the top foil 50 is engaged to the slot 13 through the second combining portion 53 and have a free end adjacent to the second combining portion 53. Accordingly, in an exemplary embodiment of the present invention, the first combining portion 33 of the bump foil 30 and the second combining portion 53 of the top foil 50 may be fixed at the slot 13 of the bearing housing 10 through the first and second engagement keys 71 and 72 as stoppers 70.

In an exemplary embodiment of the present invention, the stopper 70 and the first and second engagement keys 71 and 72 may prevent the first combining portion 33 of the bump foil 30 and the second combining portion 53 of the top foil 50 from being displaced from the slot 13 toward the front and rear sides due to external excitation or impact when the rotating machine is operated. Accordingly, in an exemplary embodiment of the present invention, the first combining portion 33 of the bump foil 30 and the second combining portion 53 of the top foil 50 may be prevented from being displaced from the slot 13 toward the front and rear sides and colliding with the rotational shaft 1 when the rotating machine is operated, and the rotational supporting performance of the rotational shaft may be further improved.

Further, in an exemplary embodiment of the present invention, the slot 13 of which both ends are open toward the front and rear sides may be formed at the bearing housing 10, and accordingly, manufacturing of the slot 13 may be simplified. In addition, in an exemplary embodiment of the present invention, the first combining portion 33 of the bump foil 30 and the second combining portion 53 of the top foil 50 may be slidably combined to the slot 13, and accordingly, assembly of the bump foil 30 and the top foil 50 to the bearing housing 10 may be simplified, and assembly time may be reduced.

Figure 7A:
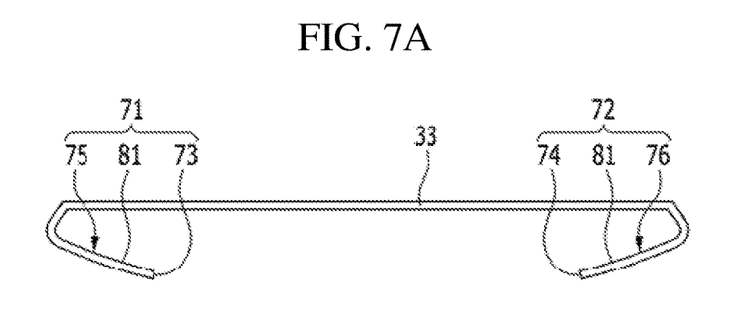
FIGS. 7A-7C are schematic views illustrating exemplary variations of the engagement keys applied to the air foil bearing assembly according to an exemplary embodiment of the present invention.
Figure 7B:
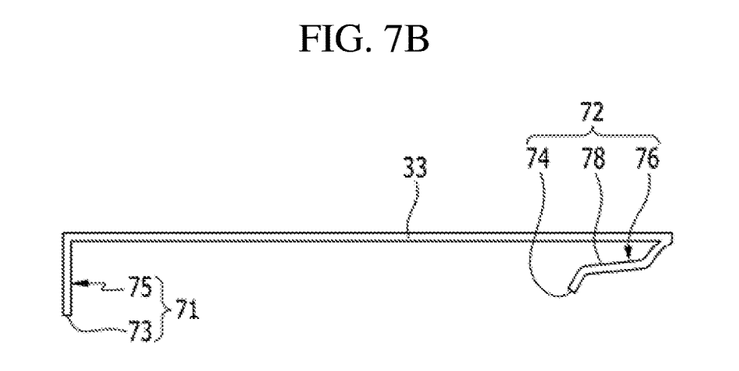
Figure 7C:
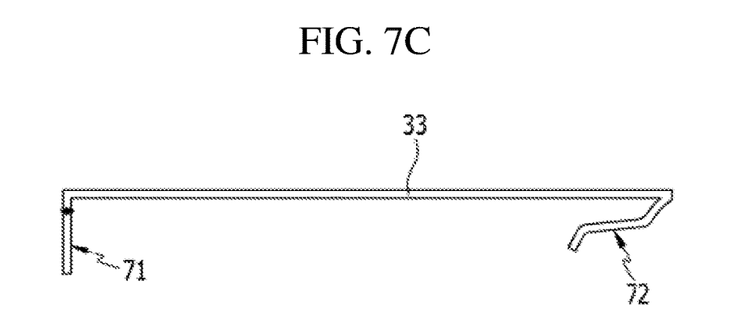

FIGS. 7A-7C are schematic views illustrating exemplary variations of the engagement keys applied to the air foil bearing assembly according to an exemplary embodiment of the present invention. Referring to FIG. 7A, a first exemplary variation of the first and second engagement keys 71 and 72 according to an exemplary embodiment of the present invention may include the engagement ends 73 and 74 and the bending portions 75 and 76, integrally extended to both ends of the first combining portion 33. However, the bending portions 75 and 76 may omit the step surface described above and have a bent shape, for example, have a plane surface 81 connected with the engagement ends 73 and 74.

Referring to FIG. 7C, in a second exemplary variation of the first and second engagement keys 71 and 72 according to an exemplary embodiment of the present invention, the second engagement key 72 may include the engagement end 74 and the bending portion 76 same as described above, integrally extended to the rear end of the first combining portion 33, and may have the step surface 78. Unlike the shape of the second engagement key 72, however, the first engagement key 71 may have the engagement end 73 and the bending portion 75, integrally extended to the front end of the first combining portion 33, for example, may include the bending portion 75 bent at about a right angle. Referring to FIG. 7C, in the first engagement key 71 according to a third variation, the bending portion 75 may not be integrally formed at the front end of the first combining portion 33 but welded to the front end by, for example, a laser.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An air foil bearing assembly, comprising:
a bearing housing that includes a hollow into which a rotary shaft is fitted and a slot which is open toward front and rear sides of the bearing housing and which is formed on an inner circumference surface of the hollow;
a bump foil that includes a first combining portion inserted into the slot and is disposed in the inner circumference surface of the hollow;
a top foil that includes a second combining portion inserted into the slot and is disposed in an inner side of the bump foil; and
a stopper disposed on the first combining portion to prevent the first combining portion from being displaced from the slot,
wherein the stopper includes an engagement key formed at front and rear ends of the first combining portion, and supporting front and rear surfaces of the bearing housing.

2. The air foil bearing assembly of claim 1, wherein the engagement key surrounds front and rear ends of the second combing portion.

3. An air foil bearing assembly, comprising:
a bearing housing that includes a hollow into which a rotary shaft is fitted and a slot formed on an inner circumference surface of the hollow, wherein the slot has a front open end that is open toward a front side of the bearing housing and a rear open end that is open toward a rear side of the bearing housing;
a bump foil that includes a first combining portion inserted into the slot and is disposed in the inner circumference surface of the hollow;
a top foil that includes a second combining portion inserted into the slot and is disposed in an inner side of the bump foil; and
an engagement key that extends from front and rear ends of the first combining portion, is bent to surround front and rear ends of the second combining portion, wherein the engagement key is configured to be elastically deformed in a width direction of the slot.

4. The air foil bearing assembly of claim 3, wherein the engagement key of the rear side is fitted into the front open end of the slot, compressed and deformed, and is restored by being withdrawn from the rear open end of the slot and supports the rear side of the bearing housing.

5. The air foil bearing assembly of claim 4, wherein the engagement key of the rear side surrounds the rear end of the second combining portion, and is slidably combined to the slot, compressed and deformed.

6. The air foil bearing assembly of claim 4, wherein the engagement key of the front side supports the front side of the bearing housing when the engagement key of the rear side is displaced from the rear open end of the slot and is restored.

7. The air foil bearing assembly of claim 3, wherein a notch groove that corresponds to the engagement key is formed at the front and rear ends of the second combining portion.

8. The air foil bearing assembly of claim 3, wherein a recess that accommodates the engagement key is formed at front and rear surfaces of the bearing housing.

9. The air foil bearing assembly of claim 8, wherein at the recess, the front and rear open ends of the slot and a supporting surface that supports the engagement key are formed.

10. The air foil bearing assembly of claim 3, wherein the engagement key includes:
an engagement end that supports the front and rear sides of the bearing housing; and
a bending portion that extends from the front and rear ends of the first combining portion and is bent such that a width between the engagement end and the first combining portion is greater than a width of the slot.

11. The air foil bearing assembly of claim 10, wherein the bending portion includes a plane surface connected with the engagement end.

12. The air foil bearing assembly of claim 10, wherein the bending portion includes a multi-stage step surface connected with the engagement end.

13. The air foil bearing assembly of claim 3, wherein the engagement key of the rear side includes:
an engagement end that supports the rear side of the bearing housing; and
a rear bending portion that extends at the rear end of the first combining portion and is bent such that a width between the engagement end and the first combining portion is greater than a width of the slot.

14. The air foil bearing assembly of claim 13, wherein the engagement key of the front side includes a front bending portion that extends from the front end of the first combining portion and is bent at about a right angle.

15. The air foil bearing assembly of claim 14, wherein the front bending portion is welded to the front end of the first combining portion.

16. An air foil bearing assembly, comprising:
a bearing housing that includes a hollow into which a rotary shaft is fitted and a slot formed on an inner circumference surface of the hollow, wherein the slot has a front open end that is open toward a front side of the bearing housing and a rear open end that is open toward a rear side of the bearing housing;
a bump foil that includes a first combining portion inserted into the slot and is disposed in the inner circumference surface of the hollow;
a top foil that includes a second combining portion inserted into the slot and is disposed in an inner side of the bump foil;
a first engagement key that extends from a front end of the first combining portion, is bent to surround a front end of the second combining portion; and
a second engagement key that extends from a rear end of the first combining portion, is bent to surround a rear end of the second combining portion,
wherein the first engagement key and the second engagement key are configured to be elastically deformed in a width direction of the slot.

17. The air foil bearing assembly of claim 16, wherein the second engagement key includes:
a rear engagement end that supports the rear side of the bearing housing; and
a rear bending portion that extends from the rear end of the first combining portion and is bent such that a width between the rear engagement end and the first combining portion is greater than a width of the slot.

18. The air foil bearing assembly of claim 16, wherein the first engagement key includes a front bending portion that extends from the front end of the first combining portion and is bent at about a right angle.

19. The air foil bearing assembly of claim 18, wherein the front bending portion is welded to the front end of the first combining portion.

* * * * *